(12) United States Patent
Velten et al.

(10) Patent No.: US 12,493,853 B2
(45) Date of Patent: Dec. 9, 2025

(54) SYSTEMS AND METHODS FOR ARRANGING MERCHANDISE AT SHELVING LOCATIONS

(71) Applicant: Walmart Apollo, LLC, Bentonville, AR (US)

(72) Inventors: Jeremy L. Velten, Bella Vista, AR (US); Leigh Ann Marie Scobey, Bentonville, AR (US); William Mark Propes, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 264 days.

(21) Appl. No.: 18/156,881

(22) Filed: Jan. 19, 2023

(65) Prior Publication Data

US 2023/0245061 A1    Aug. 3, 2023

Related U.S. Application Data

(60) Provisional application No. 63/304,758, filed on Jan. 31, 2022.

(51) Int. Cl.
*G06Q 10/087* (2023.01)
*G06Q 10/0631* (2023.01)
*G06Q 10/067* (2023.01)

(52) U.S. Cl.
CPC ..... *G06Q 10/087* (2013.01); *G06Q 10/06311* (2013.01); *G06Q 10/067* (2013.01)

(58) Field of Classification Search
CPC ........... G06Q 10/087; G06Q 10/06311; G06Q 10/067; G06Q 10/06315
USPC ............................................................ 705/28
See application file for complete search history.

(56) References Cited

U.S. PATENT DOCUMENTS

| | | | |
|---|---|---|---|
| 2015/0081088 A1* | 3/2015 | Lyon | H04L 67/10 700/216 |
| 2016/0125345 A1 | 5/2016 | Majumdar | |
| 2016/0203543 A1 | 7/2016 | Snow | |
| 2017/0148075 A1 | 5/2017 | High | |

(Continued)

OTHER PUBLICATIONS

USPTO; U.S. Appl. No. 18/156,886; Non-Final Rejection mailed Jan. 29, 2025; (pp. 1-27).

(Continued)

*Primary Examiner* — Garcia Ade
(74) *Attorney, Agent, or Firm* — Fitch, Even, Tabin & Flannery LLP (57) ABSTRACT

There are provided systems and methods for use in arranging merchandise at shelving locations of retailer facilities. In one form, the system may include: a retailer facility with shelving locations for merchandise; a planogram or merchandise database indicating the correspondence of shelving locations to categories of merchandise items; and a pick database containing a first-time pick metric corresponding to each shelving location, the first-time pick metric indicating the frequency of locating the merchandise type at the shelving location. The system may also include a control circuit that determines a set of categories of merchandise items with low first-time pick metrics, determines a subset including certain core merchandise categories and including merchandise categories with the highest sales data, and transmits a notification regarding the subset of categories.

20 Claims, 6 Drawing Sheets

(56) References Cited

U.S. PATENT DOCUMENTS

| | | |
|---|---|---|
| 2018/0232755 A1 | 8/2018 | Li |
| 2019/0228463 A1 | 7/2019 | Chan |
| 2019/0344965 A1* | 11/2019 | Wilkinson .............. G07F 11/42 |
| 2021/0004760 A1 | 1/2021 | Durkee |
| 2021/0042502 A1 | 2/2021 | Adato |
| 2021/0065102 A1 | 3/2021 | Suzuki |
| 2021/0201263 A1 | 7/2021 | Glaser |
| 2022/0101240 A1* | 3/2022 | Kassam ......... G06Q 10/063112 |
| 2022/0188910 A1* | 6/2022 | Jin .................... G06Q 10/08345 |
| 2023/0115127 A1* | 4/2023 | Ghosh ................ G06F 3/04842 |
| | | 345/633 |
| 2023/0245014 A1 | 8/2023 | Velten |

OTHER PUBLICATIONS

USPTO; U.S. Appl. No. 18/156,886; Final Rejection mailed May 20, 2025; (pp. 1-15).

USPTO; U.S. Appl. No. 18/156,886; Non-Final Rejection mailed Oct. 3, 2025; (pp. 1-13).

\* cited by examiner

SYSTEMS AND METHODS FOR ARRANGING MERCHANDISE AT SHELVING LOCATIONS

CROSS-REFERENCE TO RELATED APPLICATION

This application claims the benefit of U.S. Provisional Application No. 63/304,758, filed Jan. 31, 2022, which is incorporated by reference in its entirety herein.

TECHNICAL FIELD

This invention relates generally to arranging merchandise at retailer facilities, and more particularly, to arranging merchandise at different shelving locations of retailer facilities.

BACKGROUND

In the retail setting, merchandise is generally stored in an organized manner on the shelves of retailer facilities. If the shelves are not maintained in an organized manner, consumers may become frustrated. In addition, consumers are placing merchandise orders that are then assembled at retailer facilities by pickers. In this regard, it is desirable to have well-maintained shelves so that pickers at the retailer facility can assemble the merchandise orders quickly.

In this regard, it is desirable to be able to determine product categories at certain shelving locations at the retailer facility that may require attention. If a consumer or picker cannot find merchandise at a corresponding shelving location quickly, he or she may skip that merchandise item. Further, it is desirable to prioritize shelving locations that may require attention based on various factors, such as prioritizing core categories of merchandises items and merchandise items with the highest sales. Then, corrective activity may be taken.

BRIEF DESCRIPTION OF THE DRAWINGS

Disclosed herein are embodiments of systems, apparatuses and methods for use in the arrangement of merchandise at shelving locations of retailer facilities. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/ or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for use in the arrangement of merchandise at shelving locations of retailer facilities. In one form, the system includes: a retailer facility comprising a plurality of shelving locations for the arrangement and display of a plurality of categories of merchandise items, each shelving location corresponding to the arrangement and display of a predetermined category of merchandise item; a planogram or merchandise database indicating the correspondence of each shelving location to each category of merchandise item; and a pick database containing a first-time pick metric corresponding to each shelving location, the first-time pick metric determined by a frequency of an individual locating a predetermined category of merchandise item corresponding to each shelving location based on the planogram or merchandise database. The system also includes a control circuit configured to: access the pick database for the first-time pick metric corresponding to each shelving location; determine a set of categories of merchandise items whose first-time pick metrics are below a predetermined threshold; determine a subset from the set constituting a predetermined number of categories of merchandise items, the subset including predetermined core merchandise categories that are in the set of categories and including merchandise categories with the highest sales data relative to the other merchandise categories in the set of categories; and transmit a notification identifying the subset of categories of merchandise items.

In some implementations, in the system, the first-time pick metric is determined by an item being out of stock, being located in a shelving location different than indicated by the planogram or merchandise database, and having new packaging or pricing. In some implementations, wherein the planogram or merchandise database includes at least one of an image or price for each category of merchandise item for identification of the merchandise item when determining the first-time pick metric of each shelving location. In some implementations, the control circuit is further configured to instruct corrective activity to increase the first-time pick metric of the categories of merchandise items in the subset. In some implementations, the corrective activity is moving merchandise items at the corresponding shelving location, the corrective activity comprising at least one of restocking merchandise items, relocating merchandise items to the correct shelving location indicated by the planogram or merchandise database from an incorrect shelving location, and moving merchandise items from a topstock location to empty areas of the shelving location. In some implementations, the corrective activity involves labels at the corresponding shelving location, the corrective activity comprising at least one of replacing missing labels at the corresponding shelving location, replacing labels at the corresponding shelving location with more visible labels, arranging labels in a predetermined sequence at the corresponding shelving location, and replacing missing aisle location labels. In some implementations, the corrective activity comprises updating the planogram or merchandise database to indicate any new packaging or price for categories of merchandise items in the subset. In some implementations, the control circuit is configured to: divide the retailer facility into a plurality of functional areas; and determine the subset of merchandise categories for each functional area of the retailer facility. In some implementations, the control circuit is configured to determine the merchandise categories with the highest sales data relative to the other merchandise categories in the set of categories based on volume of units sold indicating popular sales items and based on dollar value of missed sales. In some implementations, the control circuit is configured to: determine an individual present at the retailer facility; assign a task of performing corrective activity to the individual; and transmit the task to a mobile device of the individual.

In another form, there is provided a method for use in arranging merchandise at shelving locations of retailer facilities, the method comprising: accessing, by a control circuit, a pick database for a first-time pick metric corresponding to each shelving location of a plurality of shelving locations of a retailer facility, wherein each shelving location corresponds to an arrangement and display of a predetermined category of merchandise item from a plurality of categories of merchandise items, wherein a planogram or merchandise database indicates the correspondence of each shelving location to each category of merchandise item, wherein the first-time pick metric is determined by a frequency of an individual locating the predetermined category of merchandise item corresponding to each shelving location based on the planogram or merchandise database; determining, by the control circuit, a set of categories of merchandise items whose first-time pick metrics are below a predetermined threshold; determining, by the control circuit, a subset from the set constituting a predetermined number of categories of merchandise items, the subset including predetermined core merchandise categories that are in the set of categories and including merchandise categories with the highest sales data relative to the other merchandise categories in the set of categories; and transmitting, by the control circuit, a notification identifying the subset of categories of merchandise items.

As an overview, without limitation, this disclosure is directed generally to maintaining the arrangement of merchandise items at shelving locations of retailer facilities such that merchandise items can be found quickly. This aspect applies to both consumers who may be shopping for themselves and for pickers who may be fulfilling merchandise orders of consumers or others. A consumer who cannot find a merchandise item quickly due to a poor arrangement at the shelving location may become frustrated and forego purchases. A picker who cannot find merchandise items quickly at shelving locations may be delayed in assembling the entire merchandise order. The term "picker" generally refers to individuals at the retailer facility who are selecting or picking merchandise from shelves and other locations and may include employees, independent contractors, vendors, personal shoppers, and/or other individuals.

A first-time pick metric or percentage is a performance metric that may be used as an indicator of how well a particular shelving location is arranged. In many cases, the arrangement of products at a shelving location may have considerable impact on this metric. If a picker cannot find a product quickly, he or she will move on to the next pick. Thus, a poorly organized shelving location (including out of stock at the shelving location) can have an accumulating, downstream effect. In one form, the shelving locations may be divided into hundreds of discrete regions, and the system can analyze the first-time pick data for each of these discrete regions.

The overall goal is to reduce the time it takes to fill an order. If there are current orders for products having low first pick scores, the system will identify these shelving locations so that a picker can address the shortcomings in these shelving locations. The system may use the first-time pick metric to prioritize section work. The system may combine sales data, such as product sales velocity and net profit, to identify the most important products to be addressed by employees. The prioritization factors may determine the importance of the product category and may include, for example, most popular sales items, dollar value of missed sales, and core categories of products (eggs, milk, bread, etc.).

Figure 1:
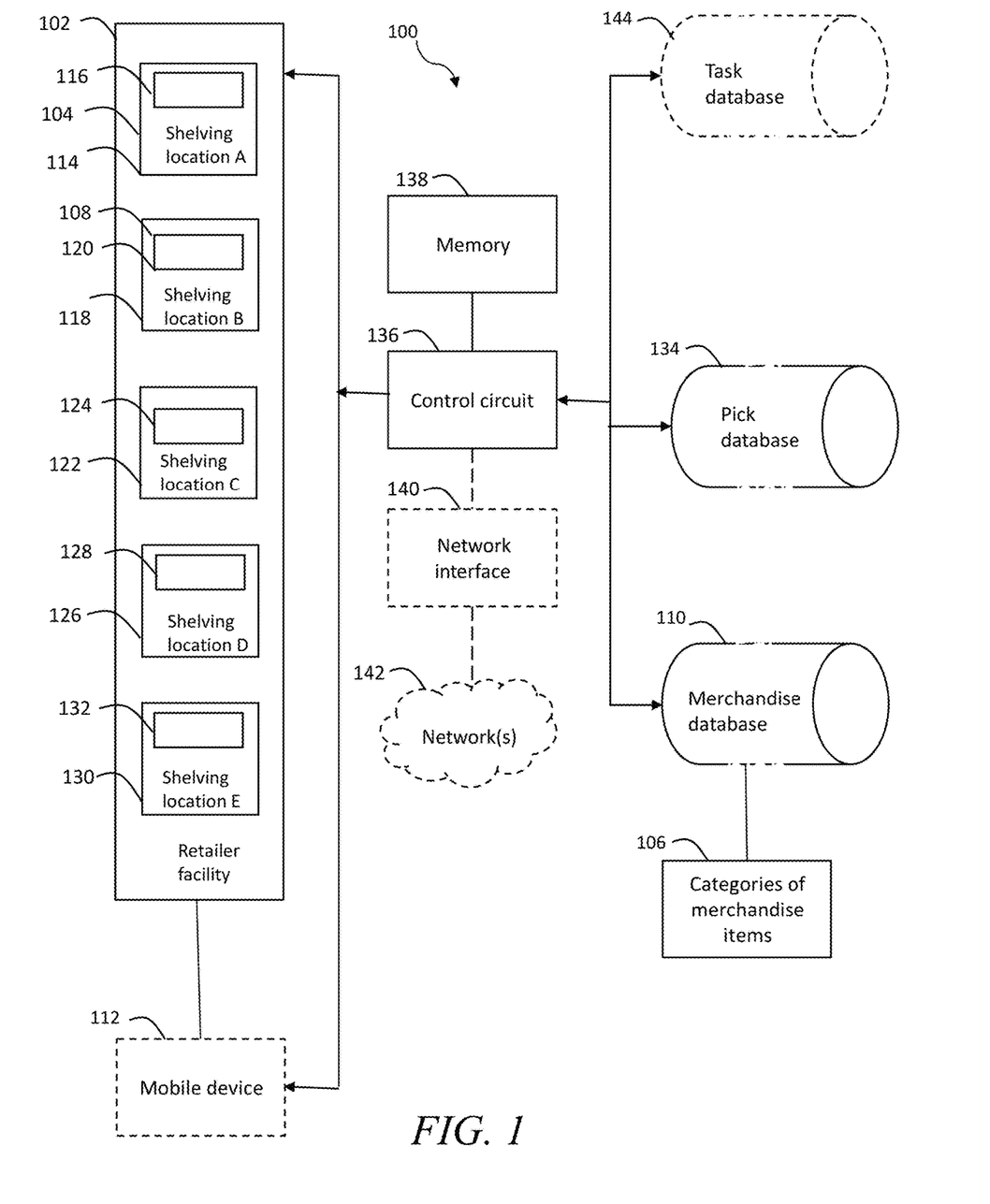
FIG. 1 is a block diagram in accordance with some embodiments.

Referring to FIG. 1, there is shown a schematic diagram showing a system 100 for use in the arrangement of merchandise at shelving locations of retailer facilities. The system 100 identifies shelving locations that are poorly organized (including out of stock at the shelving location) or otherwise delaying an individual from finding a merchandise item quickly at the shelving location. The system 100 further determines shelving locations that may require immediate corrective action by employees of the retailer.

The system 100 includes a retailer facility 102 that includes multiple shelving locations 104 for the arrangement and display of multiple categories 106 of merchandise items. Each shelving location 104 corresponds to the arrangement and display of a predetermined category 106 of merchandise item. In other words, it is generally contemplated that each category 106 of merchandise item will have a designated shelving location 104. For example, with respect to food items, it is generally contemplated that cereals, eggs, types of bread, etc., will have designated and assigned shelving locations 104. Each shelving location 104 should preferably include a number of merchandise items 108 corresponding to the designated category 106.

Further, it is generally contemplated that retailer facility 102 may refer to any of various types of facilities. For example, a "retailer facility" may refer to shopping facilities or stores that are generally accessible to the public for shopping by consumers. As another example, it may refer to fulfillment centers where pickers may fulfill online orders from stores.

The system 100 also includes a planogram or merchandise database 110 indicating the correspondence of each shelving location 104 to each category 106 of merchandise item. The term "planogram" generally refers to any sort of layout or planned arrangement, including electronic and digital layouts and arrangements. In one form, it is generally contemplated that the merchandise database 110 will contain information tracking the intended shelving location 104 for each category 106 of merchandise item. It may also be updated periodically when a category 106 is intentionally moved to a different shelving location 104 at the retailer facility 102. It is generally contemplated that a merchandise database 110 may be accessed by an individual at the retailer facility 102 via the individual's mobile device 112.

In addition, the planogram or merchandise database 110 may include an image and/or a price for each category 106 of merchandise item for identification of the merchandise item 108 when determining a first-time pick metric of each shelving location 104. For example, the image may be of the product itself or of the packaging to facilitate identification of the merchandise item 108 when a picker is attempting to fulfill a merchandise order. Further, the merchandise database 110 may include a price for the merchandise item 108, which may help an individual distinguish between merchandise items 108 that are similar in appearance. It is generally contemplated that the image and/or price may be used in determining a first-time pick metric of a shelving location 104, an indicator of how quickly an individual may find and obtain a merchandise item 108 at its intended shelving location 104.

FIG. 1 shows an example of a retailer facility 102 with multiple shelving locations 104 that are each intended for a particular group of merchandise items 108. More specifically, shelving location A (114) is intended for merchandise items A (116), shelving location B (118) is intended for merchandise items B (120), shelving location C (122) is intended for merchandise items C (124), shelving location D (126) is intended for merchandise items D (128), and shelving location E (130) is intended for merchandise items E (132). So, for example, if some or all merchandise items A are incorrectly stocked at or moved to shelving location B, they may not be found by the picker/employee.

The system 100 also includes a pick database 134 containing a first-time pick metric corresponding to each shelving location 104. The first-time pick metric is determined by the frequency of an individual locating a predetermined category 106 of merchandise item corresponding to each shelving location 104 based on the planogram or merchandise database 110. For example, in some forms, the first-time pick metric or percentage may be a measure across the day through all picking hours if items were available at the shelving location when pickers went to pick the item the first time an image of the item was displayed to them.

As stated, the first-time pick metric is a general measurement of how well-organized a particular shelving location 106 is. The organization of a shelving location refers broadly to anything that delays or inhibits picking a merchandise item at the shelving location, including, without limitation, merchandise items being out of stock at the shelf, misplaced items, missing or poor labeling, out of date packaging or pricing information in a merchandise database, etc. Generally, the first-time pick metric is a percentage indicating how often a merchandise item 108 was found at its intended location, and it is an indicator of how well pickers can find items on the shelves. In this form, it is an indicator of the shelving location's performance, i.e., its organization. As stated, the first-time pick metric may be determined by such circumstances as an item being out of stock, being located in a shelving location 104 different than indicated by the planogram or merchandise database 110, and having new packaging or pricing. A stores' overall first-time pick metric (or score) may be determined as an average of the first-time pick metrics for the merchandise categories.

Pickers often have a limited amount of time in which to pick the items of a merchandise order. If one item cannot be readily found, it may be skipped and may have to be obtained later. So, in some forms, the first-time pick metric may be considered to be the frequency a predetermined category 106 of merchandise item corresponding to each shelving location 104 can be located within a certain amount of time. In addition, although this disclosure separately addressed a merchandise database 110 and a pick database 134, it should be understood that these databases may constitute as single, combined database (and may also be combined with other databases).

The system 100 also includes a control circuit 136 that is configured to perform certain operations. In this context, the term control circuit 136 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 136 may be configured (for example, by using corresponding programming stored in a memory as will be well understood by those skilled in the art) to carry out one or more of the steps, actions, and/or functions described herein.

As shown in FIG. 1, the control circuit 136 is coupled to a memory 138 and to a network interface 140 and wireless network(s) 142. The memory 138 can, for example, store non-transitorily computer instructions that cause the control circuit 136 to operate as described herein, when the instructions are executed, as is well known in the art. Further, the network interface 140 may enable the control circuit 136 to communicate with other elements (both internal and external to the system 100). This network interface 140 is well understood in the art. The network interface 140 can communicatively couple the control circuit 136 to the wireless network 142 and whatever other networks 142 may be appropriate for the circumstances. The control circuit 136 may form part of, be coupled to, or in communication with a server of the retailer facility 102 and may make use of cloud databases and/or operate in conjunction with a cloud computing platform. As can be seen, the control circuit 136 may be coupled to one or more databases (such as merchandise database 110 and pick database 134).

The control circuit 136 accesses the pick database 134 for the first-time pick metric corresponding to each shelving location 104. In one form, different percentages will be associated with different shelving locations 104. It is generally contemplated that the first-time pick metrics may be updated periodically at predetermined intervals, such as being updated daily. After accessing, the control circuit 136 determines a set of categories 106 of merchandise items whose first-time pick metrics are below a predetermined threshold, such as, for example, below 95%. This set of merchandise categories 106 is used to establish the shelving locations 104 that may require corrective activity.

Next, the control circuit 136 determines a subset from the set constituting a predetermined number of categories 106 of merchandise items. In some forms, the subset may simply be the merchandise categories with the worst first-time pick percentages, such as, for example, the bottom ten performing merchandise categories. It may include the merchandise categories that are having the greatest overall effect on total first-time pick score of the retailer facility 102. In some forms, the subset includes predetermined core merchandise categories that are in the set of categories and including merchandise categories with the highest sales data relative to the other merchandise categories in the set of categories. For example, with respect to the food area, the core merchandise categories may include a handful of such staples as eggs, milk, and bread. So, if the set of low first-time pick metrics includes any of these core categories, they will be included in the subset.

The subset may also include merchandise categories with the highest sales data relative to the other merchandise categories in the set of categories. Certain categories may be deemed more valuable and important to address immediately because they do a higher sales volume relative to others in the set. For example, there may be a high volume of sales of cereals relative to hammers (which may be included in set of low first-time pick metrics) such that cereals should be addressed immediately. This sales data may also consider the highest lost dollars of sales of the categories in the set. For example, it may take the loss of many packages of instant noodles to equal that of a box of cereal such that cereals again should be addressed immediately. Thus, in one form, the control circuit 136 may be configured to determine the merchandise categories 106 with the highest sales data relative to the other merchandise categories in the set of categories based on volume of units sold indicating popular sales items and based on dollar value of missed sales.

In other words, the determination of the subset focuses the efforts of the individuals on the relatively more important merchandise categories. In one form, the general approach is to address shelving locations (and correct the arrangement at those locations) that will have the largest overall impact on the retailer facility 102. If popular products are not available, a customer may become frustrated and go elsewhere. In addition, it is desirable to take into account the higher value or price of certain products. Lost sales are important but losing customer confidence may also be important such that there is an emphasis on products deemed to be core products. For example, in the food area, these core categories might include such products as eggs, milk, bread, peanut butter, soda, canned vegetables, etc.

In some forms, it is contemplated that the subset of merchandise categories 106 is determined not for the entire retailer facility 102 but instead for different functional areas of the retailer facility 102. In other words, the control circuit 136 may divide the retailer facility 102 into multiple functional areas (or departments) and may determine the subset of merchandise categories 106 for each functional area of the retailer facility 102. For example, different functional areas (or departments) might include such areas as food, hardware, entertainment, apparel, etc. In FIG. 1, shelving locations A and B (114 and 118) may be in one functional area, while shelving locations C, D, and E (122, 126, and 130) may be in a second functional area. Under this approach, individuals may be able to focus their efforts on specific departments.

Then, the control circuit 136 transmits a notification identifying the subset of categories of merchandise items. It is generally contemplated that these notifications may be in the general nature of push/pull notifications. In other words, this notification may be pushed out to individuals (such as by periodically transmitting messages to an individual's mobile device 112) or it may be pulled by individuals (made available to individuals who can access the information via their mobile device). In this manner, the system 100 allows individuals to use data to see the health of the individual shelving locations 104, or side counters, throughout the retailer facility 102. In some forms, the retailer facility 102 may include hundreds of shelving locations 104, and the subset of categories may focus on the top ten shelving locations 104 that need to be addressed.

The control circuit 136 may also instruct that corrective activity be taken to increase the first-time pick metric of the categories of merchandise items in the subset. In some forms, this instruction may be for an individual to investigate each shelving location 104 in the subset to determine what the problem(s) are at each shelving location 104 and to undertake corrective activity. Alternatively, if the problem(s) at a shelving location 104 are known, the control circuit 136 may provide instructions that certain, specific corrective activity be undertaken at that shelving location 104.

The corrective activity may take various forms. For example, the corrective activity may involve moving merchandise items 108 at the corresponding shelving location 104. More specifically, it may include at least one of restocking merchandise items 108, relocating merchandise items 108 to the correct shelving location 104 indicated by the planogram or merchandise database 110 from an incorrect shelving location 104, and moving merchandise items 108 from a topstock location to empty areas of the shelving location 104. As another example, the corrective activity may involve labels at the corresponding shelving location 104. More specifically, it may include at least one of replacing missing labels at the corresponding shelving location 104, replacing labels at the corresponding shelving location 104 with more visible labels, arranging labels in a predetermined sequence at the corresponding shelving location 104, and replacing missing aisle location labels. As yet another example, the corrective activity may include updating the planogram or merchandise database 110 to indicate any new packaging or price for categories 106 of merchandise items in the subset.

In some forms, it is contemplated that the control circuit 136 may proactively manage these tasks involving corrective activity. For example, the control circuit 136 may determine an individual present at the retailer facility; assign a task of performing corrective activity to the individual; and transmit the task to a mobile device 112 of the individual. In some forms, the control circuit 136 may assign tasks to individuals who are in the vicinity of the shelving location 104. Further, the control circuit 136 may store the assignment of the task in a task database 144 and may monitor the status of the task.

Figure 2:
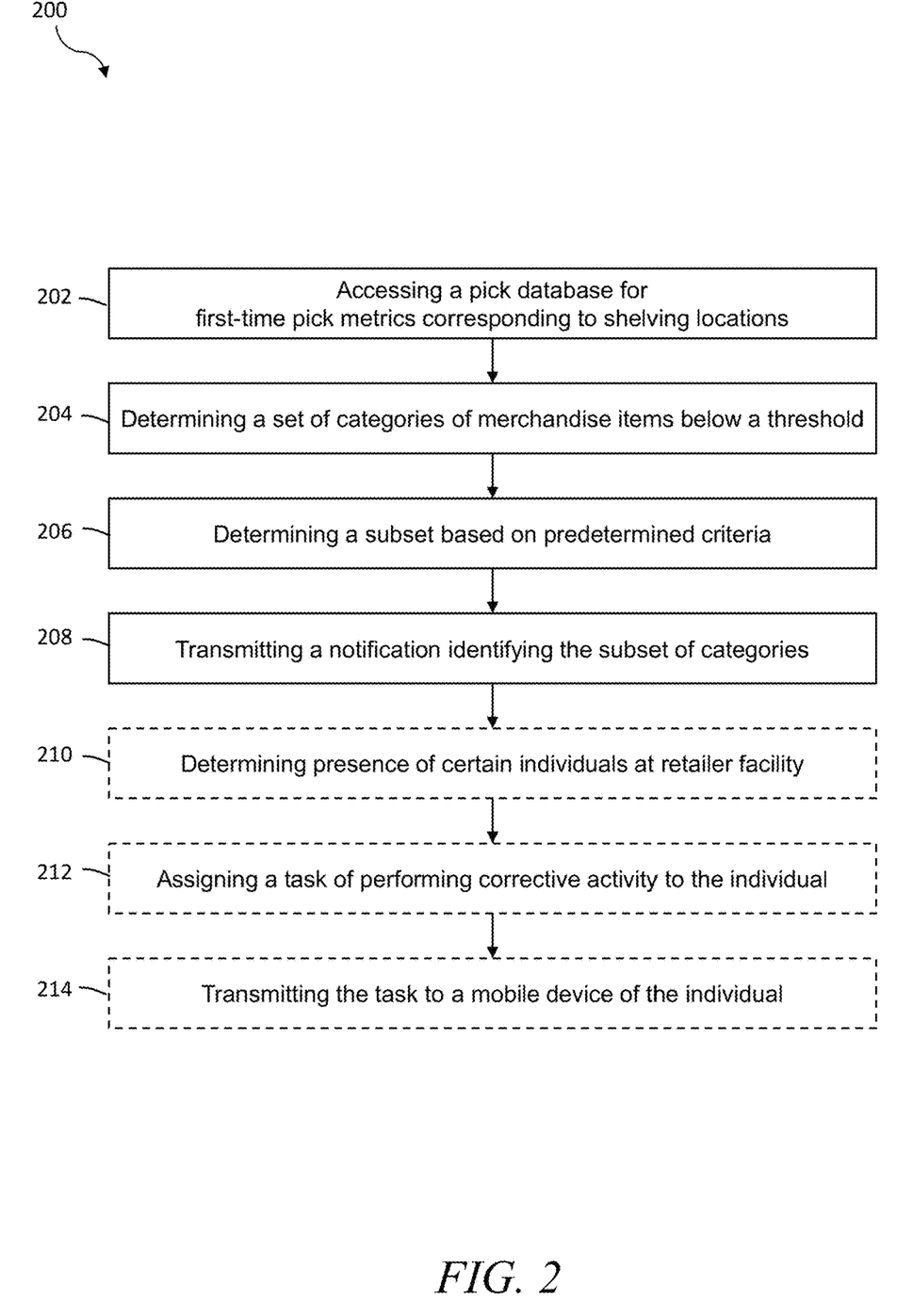
FIG. 2 is a flow diagram in accordance with some embodiments.

Referring to FIG. 2, there is shown a process 200 for use in the arrangement of merchandise shelving locations at retailer facilities. The process 200 facilitates the identification of shelving locations that are poorly organized, out of stock, or otherwise inhibiting an individual from locating a merchandise item at its designated shelving location. Poor organization or arrangement refers broadly to any sort of issue that is delaying or inhibiting picking of merchandise from a shelf location. These shelving locations require corrective action. The process 200 further determines shelving locations that require priority for individuals taking corrective action. The process 200 may incorporate some or all of the components and operations addressed above with respect to system 100.

At block 202, a pick database is accessed for first-time pick metrics corresponding to shelving locations of a retailer facility. Each shelving location corresponds to a particular category of merchandise item, and a planogram or merchandise database indicates the correspondence of each shelving location to each category of merchandise item. The first-time pick metric is determined by a frequency of an individual locating the predetermined category of merchandise item corresponding to each shelving location based on the planogram or merchandise database. The first-time pick metric may, for example, be reduced by an item being out of stock, being located in a shelving location different than indicated by the planogram or merchandise database, or having new packaging or pricing.

At block 204, a set of categories of merchandise items below a threshold is determined. In one form, a single uniform threshold may be applied to all of the merchandise items at the retailer facility (such as, for example, either 90% or 95%), and categories below that single threshold are determined. In other forms, it is contemplated that different thresholds may be applied to different merchandise categories. For example, different thresholds may be applied depending on the functional area (or department of the retailer facility). For example, one threshold may be applied to food products (such as 90%), while a different threshold may be applied to entertainment products (such as 95%). This set of categories of merchandise items generally indicates shelving locations that are below an expected level of organization and which may require attention.

At block 206, a subset of the set of merchandise categories is determined based on predetermined criteria. In some forms, the subset may simply be the merchandise categories with the worst first-time pick percentages. It may include the merchandise categories that are having the greatest overall effect on total first-time pick score of the retailer facility 102. In other examples, the subset includes predetermined core merchandise categories that are in the set of categories and includes merchandise categories with the highest sales data relative to the other merchandise categories in the set of categories. It is contemplated that a different subset may apply to different functional areas of the retailer facility. For example, one subset constituting a predetermined number of merchandise categories in the food area may be determined, and a different subset of merchandise categories in the entertainment area may be determined. This subset of categories of merchandise items indicates shelving locations that are the highest priority and require immediate attention.

The subset may include merchandise categories deemed to be core merchandise categories. These core categories are deemed of such high importance to the retailer facility (or functional area) that they must have well-organized shelving locations. The subset may also include merchandise categories with the highest sales data relative to the other merchandise categories in the set of categories. The highest sales data relative to the other merchandise categories in the set of categories may be based on volume of units sold indicating popular sales items and based on dollar value of missed sales.

At block 208, a notification is transmitted identifying the subset of categories. In one form, this notification may involve a transmission of the subset to a particular group of individuals, such as by texts or emails to mobile devices. In other forms, the notification may be in the form of data that may be stored on a database to be accessed by particular individuals or an alert or indicator that such data is available.

Optionally, the process 200 may determine and assign tasks of correcting poorly-organized shelving locations to specific employees or individuals. At block 210, the presence of one or more employees/individuals is determined, which indicates who may be available to correct issues at the shelving locations of the subset of merchandise categories. At block 212, a task of performing corrective activity is assigned to an employee or individual present at the retailer facility. The task may be general in nature, such as indicating that the employee or individual should investigate to determine the cause of the low first-time pick metric at each shelving location. Alternatively, the task may be more specific in nature if the cause is already known. At block 214, the task is transmitted to a mobile device of the employee or individual.

Figure 3:
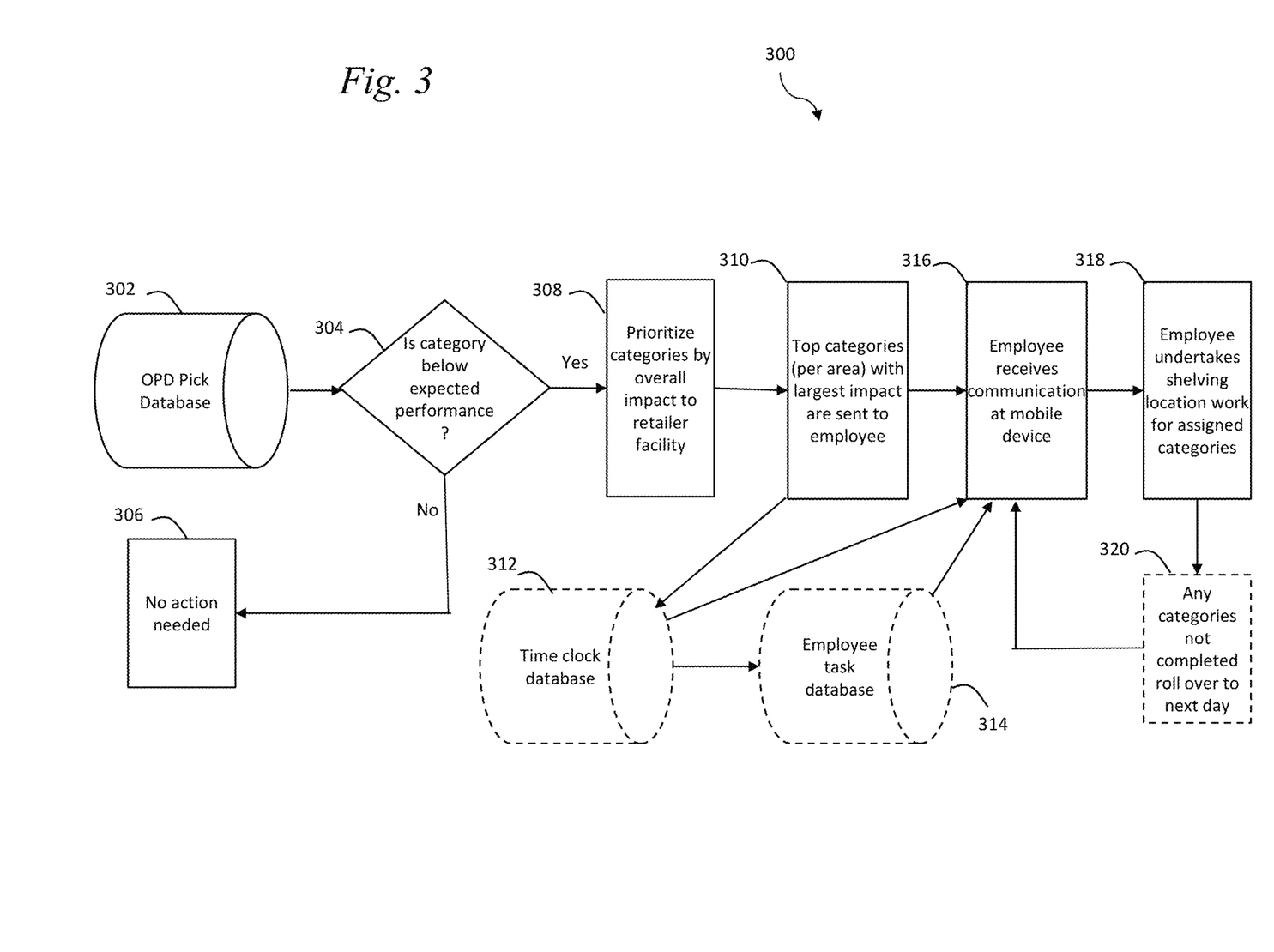
FIG. 3 is a block diagram in accordance with some embodiments.

Referring to FIG. 3, there is shown a process 300 for addressing organizational issues at the shelving locations of a retailer facility. In this form, it is generally contemplated that the retailer facility is a fulfillment center. The process 300 may incorporate some or all of the components and operations addressed above with respect to system 100 and process 200.

At block 302, there is shown an online pick-up and delivery (OPD) pick database. This database may correspond generally to order fulfillment involving dispensing an order curbside to a customer or delivering the order to a customer or store. It is generally contemplated that this OPD pick database includes first-time pick metrics for shelving locations. Each shelving location corresponds to a specific merchandise category.

At block 304, a determination is made as to whether a merchandise category falls below an expected level of performance. In other words, a determination is made as whether the first-time pick metric for a merchandise category is below an expected performance level. The first-time pick metric is also an indicator of the performance (or organization) of the shelving location corresponding to the merchandise category. An expected performance level may be established on a category-by-category basis such that the expected performance levels are different for different merchandise categories. In some forms, a functional area of the retailer area (such as the food area) may have an expected performance level that is the same across its merchandise categories but that may be different than that of other functional areas.

At block 306, a determination has been made that the category performance is not below the expected performance level. In other words, the first-time metric indicates that the performance (or organization) of the shelving location is not below the expected performance (or organization) level and does not require attention. Thus, no action is needed for this merchandise category and shelving location.

At block 308, a determination has been made that the category performance is not below the expected performance level. In other words, the first-time metric indicates that the performance (or organization) of the shelving location is, in fact, below the expected performance (or organization) level. At this block, the categories falling below expected performance levels are prioritized by their overall impact to the retailer facility. This prioritization may be based on determining if the categories falling below expected performance levels are core merchandise categories and/or have the highest sales data relative to the other categories falling below expected performance levels.

At block 310, the top categories per functional area with the largest impact on the retailer facility (such as, for example, the top ten categories per functional area) are sent to the employee. For example, the top ten categories are assigned to an employee/individual for intervention or resolution by the employee/individual these top ten categories may be sent to an employee/individual's mobile device. The assigned employee may be determined in consultation with a timeclock database (at block 312) indicating which employees are available at the retailer facility. Further, this task assignment may be recorded in an employee task database (at block 314) so that the status and progress of the task can be determined (as well as which employee was assigned the task).

At block 316, the employee receives a communication with the assigned task. For example, the employee may receive a text or email to his or her mobile device. At block 318, the employee starts performing the task, i.e., resolving organizational issues at the shelving locations corresponding to the top ten categories. This task (or corrective activity) may involve investigating why these shelving locations are result in low first-time pick metrics. The task/corrective activity may further, for example, involve moving merchandise items at or to the corresponding shelving location (such as restocking or relocating), replacing and/or arranging labels, updating a planogram or merchandise database with new packaging and/or price information for a merchandise category, and/or examining the merchandise arrangement at the shelving location. At block 320, the employee may continue work the next available work day on any merchandise categories/shelving locations that have not been completed and may communicate completion of the task when completed.

Figure 4:
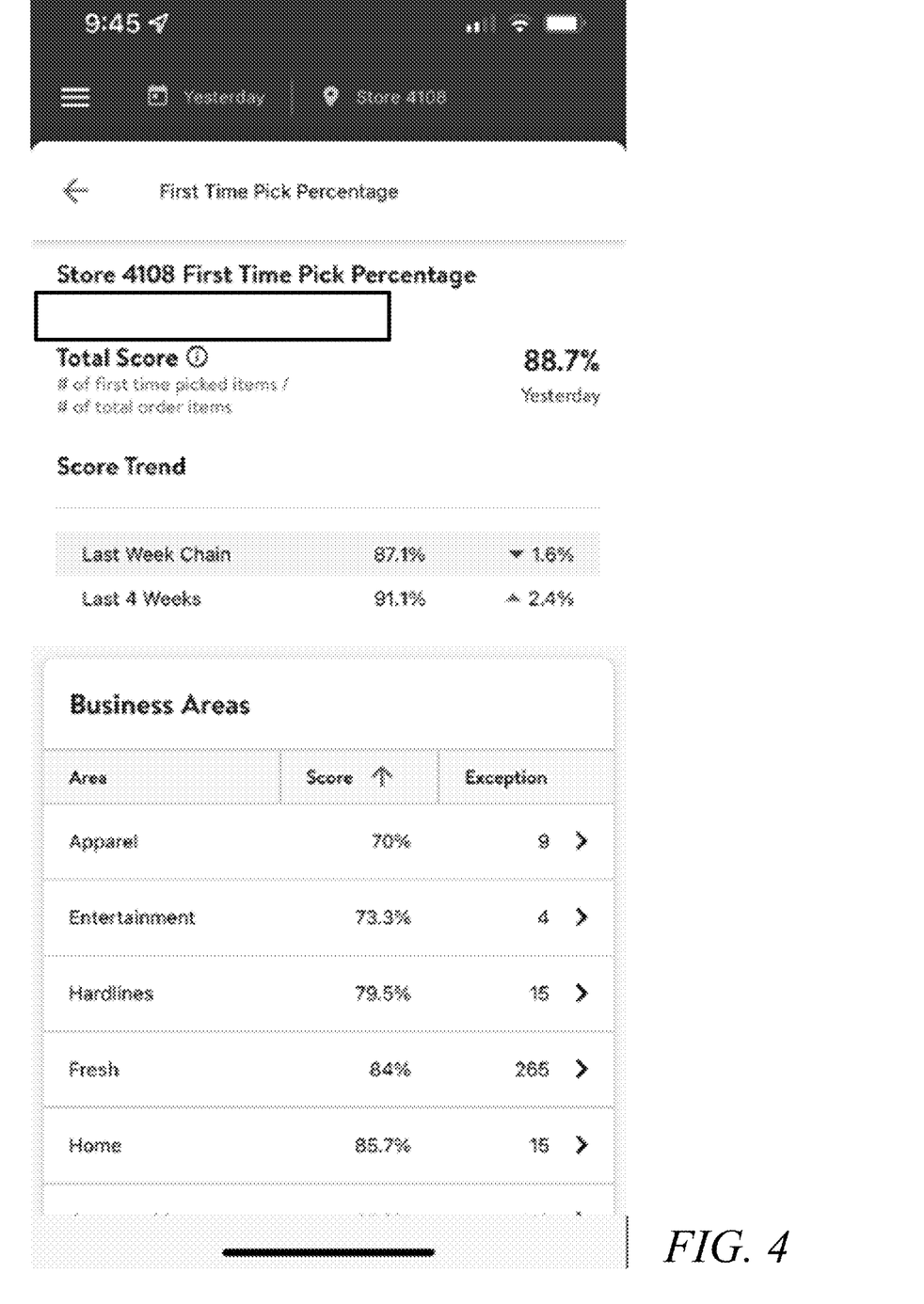
FIG. 4 is a graphical user interface in accordance with some embodiments.
Figure 5:
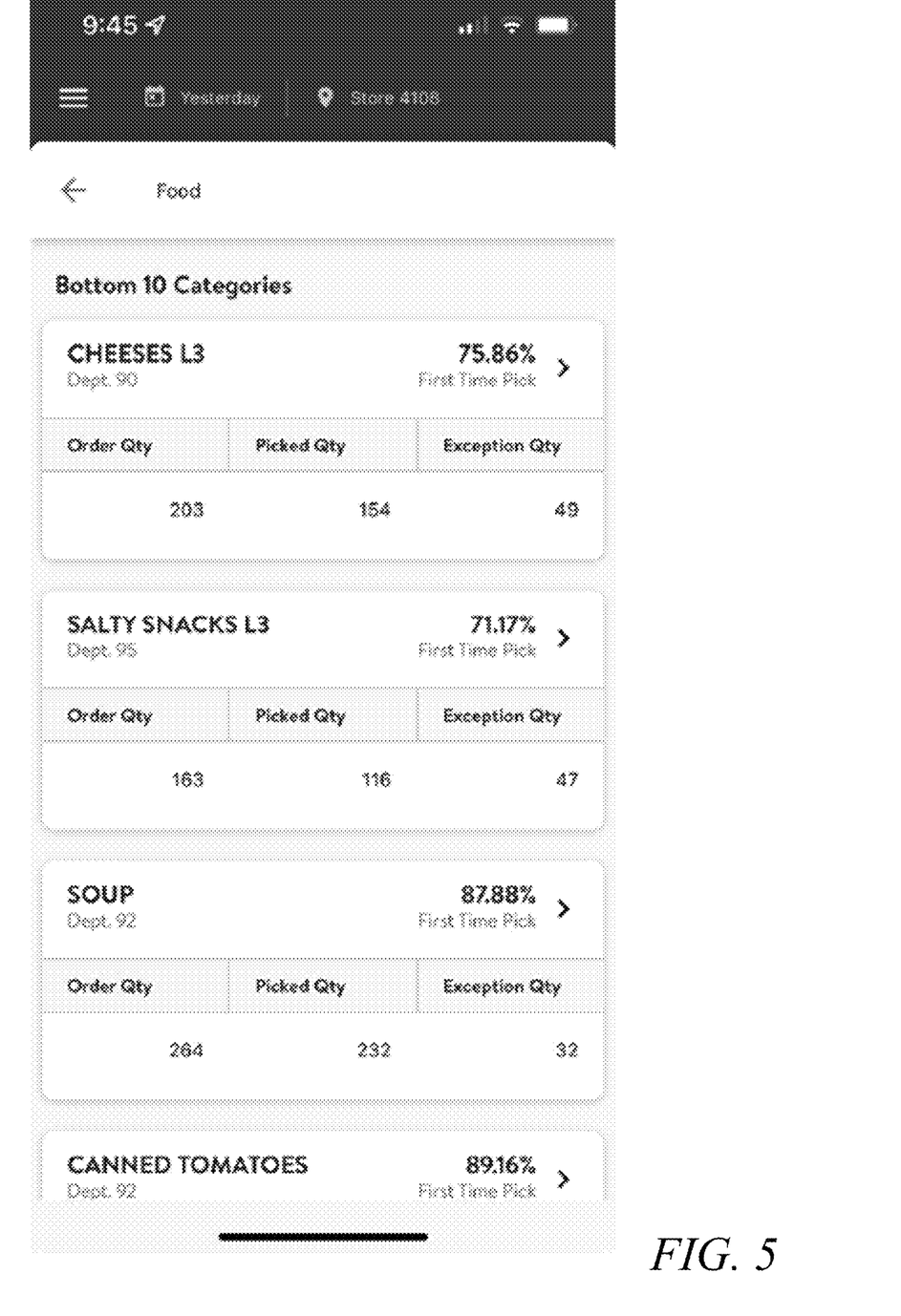
FIG. 5 is a graphical user interface in accordance with some embodiments.

Referring to FIG. 4, there is shown an example of a graphical user interface that may be displayed on an individual's mobile device. In one form, it is contemplated that a user may select a first-time pick percentage button from a general metrics page and may filter the first-time pick percentage by a desired period (such as by day, week, month, or year). In FIG. 4, the interface displays the first-time pick percentage for the preceding day. As can be seen, it displays the first-time pick percentage for various business areas (or functional areas), including apparel, entertainment, etc., although not all of the business areas are shown in FIG. 4. It also displays the total first-time pick percentage for the entire retailer facility (in this case, a store), which may be determined by combining the first-time pick percentages for all of the business areas. Under one approach, it is desirable to reduce first-time pick percentages in business areas and for merchandise areas that will have the greatest impact in lowering the total score of first-time pick percentage for the entire facility Referring to FIG. 5, there is shown an example of a graphical user interface where a specific business area has been selected in FIG. 4. More specifically, the "Food" business area has been selected. In this example, the bottom ten categories are displayed, although not all of the categories are shown in FIG. 5. As can be seen, the first-time pick percentage has been determined by dividing the picked quantity by the order quantity. In some forms, this interface may simply indicate the bottom ten categories of first-time pick percentage without modification. In other forms, however, this interface indicates the bottom ten categories after having been prioritized by such factors as sales data, as to whether the category is a core category, or some other factor having a significant impact on the total overall score of the facility.

Figure 6:
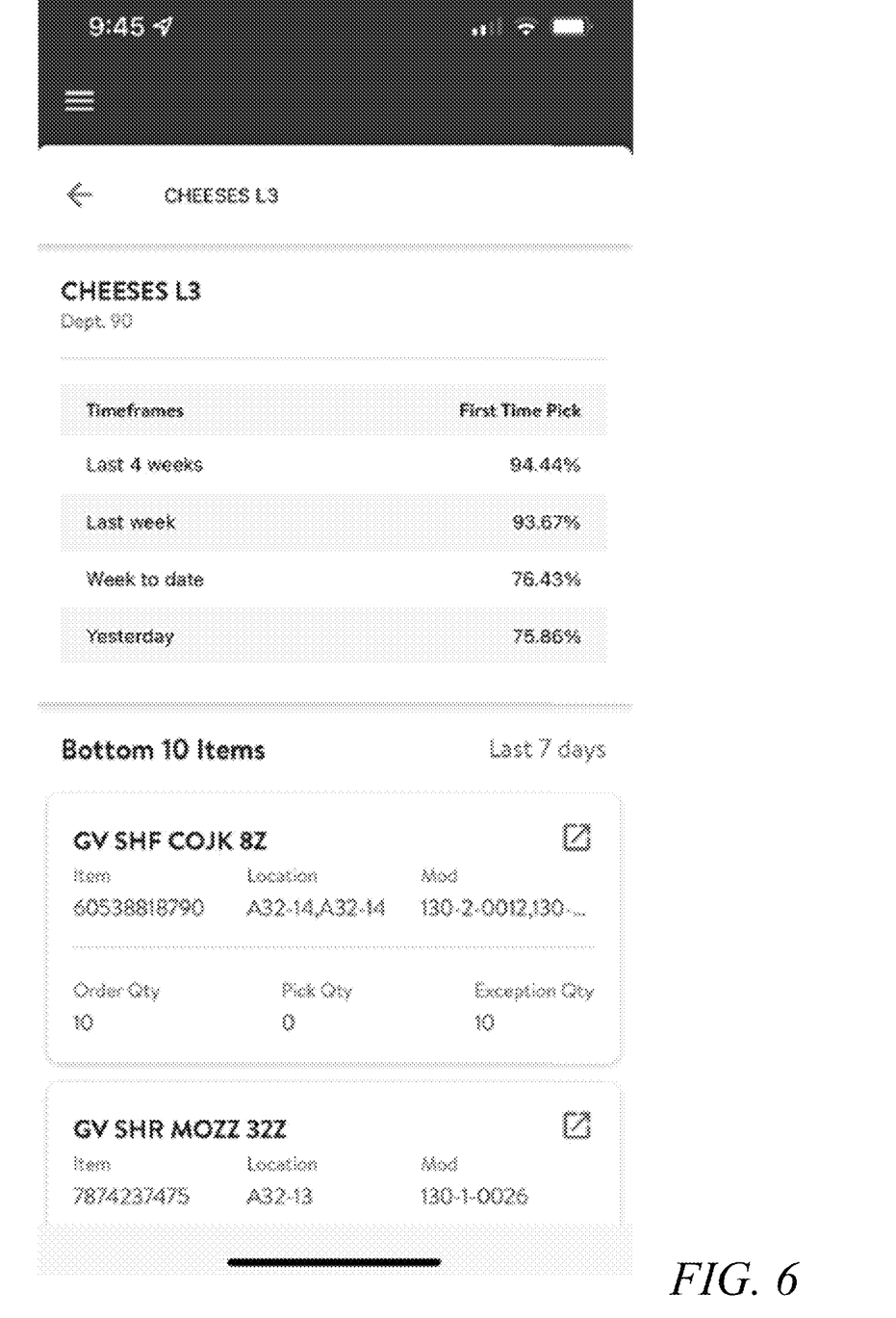
FIG. 6 is a graphical user interface in accordance with some embodiments.

Referring to FIG. 6, there is shown an example of a graphical user interface where a specific category has been selected in FIG. 5. More specifically, the "Cheese L3" category has been selected. As can be seen, this selection allows the user to see subcategories included within the selected category. In some forms, this interface may simply display the bottom ten subcategories of first-time pick percentage without modification (although not all of the subcategories are shown in FIG. 6). In other forms, however, this interface may display the bottom ten categories after having been prioritized by the factors discussed above and other factors having a significant impact on the total overall score of the facility.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for use in arrangement of merchandise at shelving locations of retailer facilities, the system comprising:

a retailer facility comprising a plurality of shelving locations for arrangement and display of a plurality of categories of merchandise items, each shelving location corresponding to arrangement and display of a predetermined category of merchandise item;

a merchandise database indicating correspondence of a shelving location to a category of merchandise item;

a pick database containing a first-time pick metric corresponding to each shelving location, the first-time pick metric determined by a frequency of an individual locating a predetermined category of merchandise item corresponding to each shelving location based on the merchandise database;

a control circuit to:

access a plurality of records in the pick database, each record corresponding to a shelving location, for the first-time pick metric corresponding to each shelving location;

compare the first-time pick metric corresponding to each shelving location to a predetermined threshold value;

determine a set of categories of merchandise items whose first-time pick metrics are below the predetermined threshold value;

compare the set of categories of merchandise items to a predetermined list of core merchandise categories;

determine a subset from the set of categories of merchandise items, the subset including merchandise categories that are both in the set and also in a list of predetermined core merchandise categories;

in response to a determination of the subset including merchandise categories that are both in the set and also in the list of predetermined core merchandise categories, automatically trigger a mobile device to initiate corrective activity to increase the first-time pick metric of the categories of merchandise items in the subset.

2. The system of claim 1, wherein the first-time pick metric is determined by an item being out of stock, being located in a shelving location different than indicated by the merchandise database, and having new packaging or pricing.

3. The system of claim 1, wherein the merchandise database includes at least one of an image or price for each category of merchandise item for identification of the merchandise item when determining the first-time pick metric of each shelving location.

4. The system of claim 1, wherein the corrective activity is moving merchandise items at the corresponding shelving location, the corrective activity comprising at least one of restocking merchandise items, relocating merchandise items to a correct shelving location indicated by the merchandise database from an incorrect shelving location, and moving merchandise items from a stocking location to empty areas of the shelving location.

5. The system of claim 1, wherein the corrective activity involves labels at the corresponding shelving location, the corrective activity comprising at least one of replacing missing labels at the corresponding shelving location, replacing labels at the corresponding shelving location with more visible labels, arranging labels in a predetermined sequence at the corresponding shelving location, and replacing missing aisle location labels.

6. The system of claim 1, wherein the corrective activity comprises updating the merchandise database to indicate any new packaging or price for categories of merchandise items in the subset.

7. The system of claim 1, wherein the control circuit to:
divide the retailer facility into a plurality of functional areas; and
determine the subset of merchandise categories for each functional area of the retailer facility.

8. The system of claim 1, wherein the control circuit to determine the merchandise categories with highest sales data relative to other merchandise categories in the set of categories based on volume of units sold indicating popular sales items and based on dollar value of missed sales.

9. The system of claim 1, wherein the control circuit to:
determine an individual present at the retailer facility;
assign a task of performing corrective activity to the individual; and
transmit the task to the mobile device, the mobile device corresponding to the individual.

10. A method for use in arranging merchandise at shelving locations of retailer facilities, the method comprising:
accessing, by a control circuit, a plurality of records in a pick database for a first-time pick metric corresponding to each shelving location of a plurality of shelving locations of a retailer facility, wherein each shelving location corresponds to an arrangement and display of a predetermined category of merchandise item from a plurality of categories of merchandise items, wherein a merchandise database indicates correspondence of a shelving location to a category of merchandise item, wherein the first-time pick metric is determined by a frequency of an individual locating the predetermined category of merchandise item corresponding to each shelving location based on the merchandise database;
comparing, by the control circuit, the first-time pick metric corresponding to each shelving location to a predetermined threshold value;
determining, by the control circuit, a set of categories of merchandise items whose first-time pick metrics are below the predetermined threshold value;
comparing, by the control circuit, the set of categories of merchandise items to a list of predetermined core merchandise categories;
determining, by the control circuit, a subset from the set of categories of merchandise items, the subset including merchandise categories that are both in the set and also in the list of predetermined core merchandise categories; and
in response to a determination of the subset including merchandise categories that are both in the set and also in the list of predetermined core merchandise categories, by the control circuit automatically triggering a mobile device to initiate corrective activity to increase the first-time pick metric of the categories of merchandise items in the subset.

11. The method of claim 10, wherein the first-time pick metric is determined by an item being out of stock, being located in a shelving location different than indicated by the merchandise database, and having new packaging or pricing.

12. The method of claim 11, wherein the merchandise database includes at least one of an image or price for each category of merchandise item for identification of the merchandise item when determining the first-time pick metric of each shelving location.

13. The method of claim 10, wherein the corrective activity is moving merchandise items at the corresponding shelving location, the corrective activity comprising at least one of restocking merchandise items, relocating merchandise items to a correct shelving location indicated by the merchandise database from an incorrect shelving location, and moving merchandise items from a stocking location to empty areas of the shelving location.

14. The method of claim 10, wherein the corrective activity involves labels at the corresponding shelving location, the corrective activity comprising at least one of replacing missing labels at the corresponding shelving location, replacing labels at the corresponding shelving location with more visible labels, arranging labels in a predetermined sequence at the corresponding shelving location, and replacing missing aisle location labels.

15. The method of claim 10, wherein the corrective activity comprises updating the merchandise database to indicate any new packaging or price for categories of merchandise items in the subset.

16. The method of claim 10, further comprising, by the control circuit:
dividing the retailer facility into a plurality of functional areas; and
determining the subset of merchandise categories for each functional area of the retailer facility.

17. The method of claim 10, further comprising, by the control circuit, determining the merchandise categories with highest sales data relative to other merchandise categories in the set of categories based on volume of units sold indicating popular sales items and based on dollar value of missed sales.

18. The method of claim 10, further comprising, by the control circuit:
determining an individual present at the retailer facility;
assigning a task of performing corrective activity to the individual; and
transmitting the task to the mobile device, the mobile device corresponding to the individual.

19. The system of claim 1, further comprising:
a timeclock database indicating employees available at the retailer facility;
an employee task database tracking status and progress of assigned tasks;
wherein the control circuit is to:
determine an employee available to perform the corrective activity by accessing the timeclock database;
signal the mobile device to initiate the corrective activity, the mobile device corresponding to the employee; and
record, in the employee task database, the employee as being assigned to perform the corrective activity.

20. The system of claim 1, wherein the merchandise database and the pick database constitute a single, combined database.

* * * * *